(12) United States Patent
Bran

(10) Patent No.: US 10,992,907 B1
(45) Date of Patent: Apr. 27, 2021

(54) VIDEO CONFERENCING SYSTEM FOR RECONFIGURABLE ROOMS

(71) Applicant: Plantronics, Inc., Santa Cruz, CA (US)

(72) Inventor: Cary Arnold Bran, Vashon, WA (US)

(73) Assignee: PLANTRONICS, INC., Santa Cruz, CA (US)

(*) Notice: Subject to any disclaimer, the term of this patent is extended or adjusted under 35 U.S.C. 154(b) by 0 days.

(21) Appl. No.: 16/897,763

(22) Filed: Jun. 10, 2020

(51) Int. Cl.
*H04N 7/15* (2006.01)
*H04L 12/18* (2006.01)

(52) U.S. Cl.
CPC ......... *H04N 7/157* (2013.01); *H04L 12/1822* (2013.01)

(58) Field of Classification Search
CPC .................................. H04N 7/15; H04L 12/18
USPC ............................................ 348/14.01–14.16
See application file for complete search history.

(56) References Cited

U.S. PATENT DOCUMENTS

| | | | |
|---|---|---|---|
| 2005/0024484 A1* | 2/2005 | Leonard | H04N 7/142 348/14.01 |
| 2014/0169184 A1* | 6/2014 | Badt, Jr. | H04L 49/40 370/248 |
| 2017/0147018 A1* | 5/2017 | Meruva | G06F 13/364 |
| 2017/0280420 A1* | 9/2017 | Brennan | H04W 4/80 |

OTHER PUBLICATIONS

Combining & Multi-Use Rooms, https://www.jaystanley.com/systems/combining-multi-use-rooms-ballrooms/, 3 pages, Feb. 6, 2020.

* cited by examiner

*Primary Examiner* — Melur Ramakrishnaiah
(74) *Attorney, Agent, or Firm* — Slayden Grubert Beard PLLC

(57) ABSTRACT

A video conferencing system for a reconfigurable meeting room is disclosed. To make the process of reconfiguring a video conferencing system easy and frictionless and in an embodiment, the system may comprise a camera for capturing video of at least a section of the meeting room and to provide video data; a microphone for capturing audio in the meeting room and to provide audio data; and processing circuitry, connected at least with the camera and microphone to receive at least one of the video and audio. The processing circuitry is configured to determine if a change in the layout of the meeting room has occurred, using at least one of the camera and the microphone, and upon determination that the change in the layout has occurred, operate in a proximity joining mode in which the processing circuitry allows linking with at least one proximate video conferencing system for joined operation.

18 Claims, 7 Drawing Sheets

VIDEO CONFERENCING SYSTEM FOR RECONFIGURABLE ROOMS

FIELD

The present disclosure relates generally to the field of video conferencing and in particular to a video conferencing system for reconfigurable rooms, such as rooms with movable partition walls.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Video conferencing systems, also sometimes referred to as videotelephony systems or telepresence systems, are ubiquitous today for office spaces and meeting/conference rooms. Typically, such systems comprise at least a camera, a microphone, a video screen, and speakers. These devices are usually somewhat permanently installed in the respective meeting room and may be connected to a central unit, which handles the incoming and outgoing video and audio streams to one or multiple remote conferencing participants.

Group collaboration today is largely conducted using meeting rooms equipped with such video conferencing systems, for example due to globalized teams working together, but also due to the fact that an increasing number of businesses/companies embrace an 'open office environment' that provides a decreased number of enclosed offices for employees. Because of the noisy nature of the open office environment, group collaboration, when it occurs, is often forced into the meeting rooms available to the company. This typically results in a company's meeting rooms being treated as scarce resource and forces the facilities organization within a company to monitor room utilization and optimize the room size to match the utilization patterns of the company's employees.

As the inventor of this invention ascertained, one way to optimize room utilization is by leveraging movable walls, such as floor to ceiling room dividers, that are placed between adjacent meeting rooms instead of typical fixed walls. Such dividers allow the physical space to 'shrink and grow', i.e., to be reconfigured for differing numbers of local conferencing participants, with little effort.

If such a meeting room is equipped with a video conferencing system, or two adjacent meeting rooms are equipped with two such separate video conferencing systems, a physical reconfiguration of the meeting room requires the video conferencing systems to be reconfigured accordingly. For instance, in case a movable wall between two meeting rooms is removed, which both have separate video conferencing systems, the two separate video conferencing systems need to be reconfigured to work in concert.

Today, such reconfiguration is conducted manually, such as by connecting the camera and microphone of one of the video conferencing systems to the respective other video conferencing system, which then operates in a multi-camera/multi-microphone mode. This is typically done by physically reconnecting the respective connection cables.

Based on the above, an object exists to make the process of reconfiguring a video conferencing system for a meeting room easy and frictionless.

SUMMARY

The object is solved by the subject matter of the independent claims. The dependent claims and the following description describe various embodiments of the invention.

In general and in one exemplary aspect, a video conferencing system for a reconfigurable meeting room is provided, which video conferencing system comprises at least: a camera for capturing video of at least a section of the meeting room and to provide video data; a microphone for capturing audio in the meeting room and to provide audio data; and processing circuitry, connected at least with the camera and microphone to receive at least one of the video and audio. In the present, exemplary aspect, the processing circuitry is configured to determine if a change in the layout of the meeting room has occurred, using at least one of the camera and the microphone, and upon determination that the change in the layout has occurred, operate in a proximity joining mode in which the processing circuitry allows linking with at least one proximate video conferencing system for joined operation.

In another exemplary aspect, processing circuitry for a video conferencing system for a reconfigurable meeting room is provided, wherein the processing circuitry being connectable with one or more of a camera and a microphone to receive at least one of video and audio; and wherein the processing circuitry is configured to determine if a change in the layout of the meeting room has occurred, using at least one of the camera and the microphone, and upon determination that the change in the layout has occurred, operate in a proximity joining mode in which the processing circuitry allows linking of the video conferencing system with at least one proximate video conferencing system for joined operation.

In another exemplary aspect, a method of operating a video conferencing system for a reconfigurable meeting room is provided, wherein the video conferencing system comprising at least one of a camera for capturing video of at least a section of the meeting room and a microphone for capturing audio in the meeting room. The method comprises the steps of: determining, using at least one of the camera and the microphone, if a change in the layout of the meeting room has occurred; and upon determination that the change in the layout has occurred, operating in a proximity joining mode in which the video conferencing system allows linking with at least one proximate video conferencing system for joined operation.

The details of one or more embodiments are set forth in the accompanying drawings and the description below. Other features will be apparent from the description, drawings, and from the claims.

DETAILED DESCRIPTION

Figure 1:
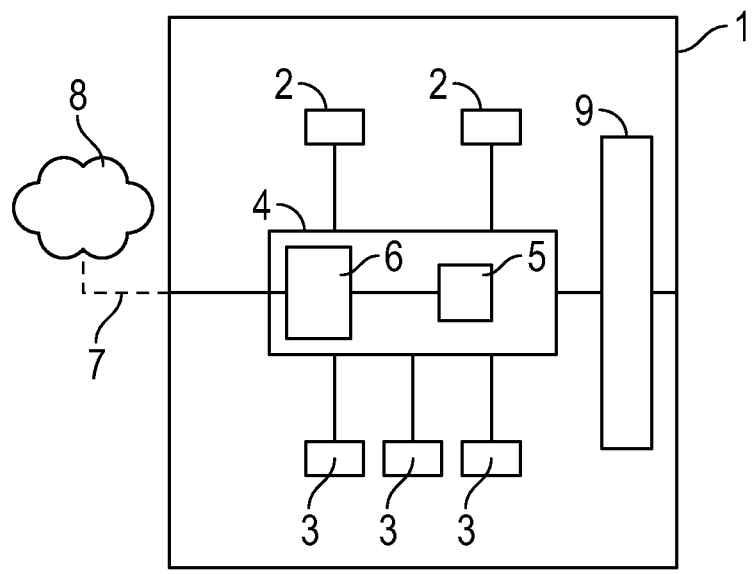
FIG. 1 shows an exemplary embodiment of a video conferencing system in a schematic block diagram.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data, video, and/or audio (signal) connection between at least two components, devices, units, processors, circuits, or modules. Such a connection may be direct between the respective components, devices, units, processors, circuits, or modules; or indirect, i.e., over intermediate components, devices, units, processors, circuits, or modules. The connection may be permanent or temporary; wireless or conductor based; digital or analog.

For example, a data, video, and/or audio connection may be provided over a direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a suitable communications protocol. In some embodiments, a USB connection, a HDMI connection, a HDCI connection, a Bluetooth network connection, a Wi-Fi connection, and/or a LAN connection is used to transmit video, audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In light of the increased demand for meeting rooms, many of today's businesses treat the meeting rooms as scarce resource. As the inventor of this invention ascertained, one way to optimize room utilization is by leveraging sound dampening floor to ceiling room dividers that are placed between adjacent meeting rooms. Such dividers allow the physical space to 'shrink and grow', i.e., to be reconfigured for differing requirements (e.g., number of local conferencing participants), with minimal effort. In the context of the present discussion, the terms 'room divider', '(re)movable wall', 'movable partition wall', 'movable wall panel', 'accordion room divider', and 'demountable wall' are used interchangeably, even though the terms may be used in the art to designate different designs of dividers or walls. However, the respective differences are negligible for the present discussion as these all refer to devices for reconfiguring the layout of rooms.

If such a meeting room is equipped with a video conferencing system, or two adjacent meeting rooms are equipped with two such separate video conferencing systems, a physical reconfiguration of the meeting room requires the video conferencing systems to be reconfigured accordingly. The present invention aims to make the process of reconfiguring the video conferencing system similarly frictionless as the reconfiguration of the physical space and to provide a user a fast and efficient way to obtain a streamlined in-room video conferencing experience.

According to a first exemplary aspect, a video conferencing system for a reconfigurable meeting room is provided. The video conferencing system may be of any suitable type to capture and, e.g., transmit audio and/or video to at least one remote device of a remote conferencing participant, i.e., someone, who is not in the meeting room. A remote conferencing participant may be a recording device in corresponding embodiments. The term 'video conferencing system' is used interchangeably herein with 'videotelephony system' and 'telepresencesystem'.

The video conferencing system of this aspect may be configured to be temporarily or permanently installed in the meeting room, so that video and audio in the meeting room may be captured. It is noted that herein, the terms 'meeting room', 'conference room', 'huddle room', 'huddle space', 'team room', 'board room', and 'conferencing room' are used interchangeably for a dedicated enclosed space, usually in a building, structure, or vehicle.

The video conferencing system of this aspect system comprises at least: a camera for capturing video of at least a section of the meeting room and to provide video data; a microphone for capturing audio in the meeting room and to provide audio data; and processing circuitry, connected at least with the camera and microphone and adapted to receive the captured audio and/or video.

The aforesaid camera, microphone, and processing circuitry may in some embodiments be formed integrated, e.g., in a common housing or enclosure. For example, the video conferencing system may be a 'video bar', e.g., one that has all or most of its components in a compact housing (see, e.g., the Poly Studio X family of the applicant). Alternatively or additionally, the system may be of 'video all-in-one' type, i.e., a single unit for video conferencing, whiteboarding, and sharing documents. Alternatively and in some embodiments, at least some of the camera, the microphone, and the processing circuitry are formed separately from each other and may then be communicatively coupled, e.g., by suitable wireless or wire-based connections. For example, the processing circuitry may be provided separately from the camera and/or microphone to allow it to be installed in an equipment room, server room, or other location, which may be remote from the meeting room. In this example, accordingly, only the camera and microphone are physically arranged in the meeting room.

The camera and microphone may be of any suitable type. For example, the camera may be a high definition camera that, e.g., has a wide field of view. The microphone may for example be of dynamic, condenser, electret, ribbon, carbon, piezoelectric, fiber optic, laser, or MEMS type. The microphone may be omnidirectional or bidirectional. In some embodiments, the microphone is a boundary microphone that, e.g., may be provided as a table-top unit for a corresponding conference table.

In some embodiments, the system comprises more than one camera and/or more than one microphone. The latter embodiments are particularly suitable for larger meeting rooms, where multiple cameras and/or microphones may be necessary to allow each local conferencing participant in the meeting room to participate in the video conference and to be adequately heard and seen by any remote conferencing participant. In some embodiments, the camera is a camera module that has multiple cameras. In some embodiments, the processing circuitry is configured to dynamically select a camera and/or microphone that captures the local conferencing participant who currently presents/talks.

In some embodiments, the multiple cameras spaced apart from each other in one or more directions to provide different view perspectives. For example, the system may include multiple cameras housed in or on a common camera housing or camera mount. Each camera may be set or controlled to capture a full area of a presentation environment/meeting room, or each camera may be set or controlled to capture different areas of the presentation environment/meeting room. Additionally or alternatively and in some embodiments, each camera may be controlled, e.g., panned, tilted, and/or zoomed, independent of each other camera.

In the video conferencing system of the present aspect, the processing circuitry is configured to determine if a change in the layout of the meeting room has occurred, using at least one of the camera and the microphone. In other words, the video data and/or the audio data, provided by the camera and the microphone is used by the processing circuitry to determine the change in the layout of the meeting room. Consequently, the video conferencing system may not require any external components to determine the change in the meeting room's layout, which is particularly cost-efficient. The term 'change in the layout of the meeting room' is understood broadly to any reconfiguration of the meeting room that in turn may require a corresponding change in the configuration of the video conferencing system. For example, a change in the layout may refer to a removal of a movable wall between adjacent meeting rooms.

The processing circuitry of the present aspect is further configured to, upon determination that the change in the layout has occurred, operate in a proximity joining mode in which the processing circuitry can be linked with at least one proximate video conferencing system for joined operation. Such a proximate video conferencing system may be a video conferencing system installed in an adjacent (meeting) room, i.e., a room, arranged next to the meeting room. The at least one proximate video conferencing system may be of the same type or of a different type. In any event, the at least one proximate video conferencing system should be configured for the joined operation, which will be discussed in detail in the following.

The processing circuitry may be of any suitable type to conduct at least the aforesaid operation. For example, the processing circuitry may comprise a microprocessor with suitable programming in a memory to provide the functionality as discussed herein. Alternatively or additionally and in some embodiments, the processing circuitry may comprise hard-wired logic circuitry to provide the discussed functionality.

The video conferencing system according to the present aspect and in further embodiments certainly may comprise additional components. For example, the system in one exemplary embodiment may comprise additional control circuitry, additional circuitry to process audio and/or video, wireless or wired communications interfaces, a central processing unit, one or more housings, a mains power supply, battery, one or more video output devices, e.g., for incoming conference video, and/or one or more speakers, e.g., for incoming conference audio.

In some embodiments, the video conferencing system comprises a communication interface that is connected with the processing circuitry and adapted to transmit at least one of the video data and the audio data to at least one remote conferencing participant. In some embodiments, the communication interface is a network interface to connect to a LAN, WAN, and/or the Internet. In some embodiments, the processing circuitry controls the transmission of the video data and audio data to the at least one remote conferencing participant and/or the reception of video data and/or audio data from the at least one remote conferencing participant. In alternative embodiments, a transmission management processor provides the latter functionality, i.e., management of incoming and/or outgoing video/audio.

In some embodiments, the processing circuitry is adapted to determine whether a change in the layout of the meeting room has occurred by detecting a removal of a movable partition of the meeting room. Such a movable partition/movable wall may be arranged at any end of the meeting room and may connect two adjacent meeting rooms when removed. In some embodiments, the processing circuitry is adapted to determine removal of multiple movable partitions. For example, if the meeting room has adjacent meeting rooms on both sides, i.e., the meeting room is a 'middle' meeting room, the processing circuitry may be adapted determine if one or both movable partitions are removed. In some embodiments, the processing circuitry is configured to discern which of the movable partitions is removed, while in other embodiments, the processing circuitry is configured to determine removal of at least one movable partition.

In some embodiments, the processing circuitry is adapted to detect the removal of the movable partition using the camera. For example, the processing circuitry may be configured for object detection in the video data to detect the removal of the movable partition. In the context of object detection and in some embodiments, the processing circuitry may be trained to determine the movable partition by its optical characteristic or the difference in the image between the movable partition being in place and the movable partition being removed. For example, the 'POLO v3' algorithm may be used. In the preceding embodiments, the camera (or at least one of the cameras in case of multiple cameras) may be pointed so that it captures at least a part of the movable partition.

In some embodiments, the processing circuitry is configured to detect one or more markers, placed on the movable partition. Such markers may be detected easily in the video data of the room and thus allows to detect the removal of the movable partition using the camera reliably. In some embodiments, one or more of a QR code, a bar code, a pattern, and a logo is used as the marker.

In some embodiments, the processing circuitry is adapted to detect the removal of the movable partition using the microphone. For example, the processing circuitry may be configured to determine the resulting change in the acoustic properties of the meeting room once the movable partition is removed or the difference in the acoustic properties between a situation, where the movable partition is in place and a situation, where the movable partition is removed. Such determination may, e.g., be made by measurement of the acoustic response of the meeting room with and without the movable partition in place.

In some embodiments, the processing circuitry is configured to detect the removal of the movable partition by determining the presence of an optical and/or acoustical beacon. Such a beacon may, e.g., be provided by the at least one proximate video conferencing system using a light emitter, and, e.g., an invisible light emitter (e.g., infrared LED). Alternatively or additionally, the beacon may be provided by the at least one proximate video conferencing system using a sound emitter (e.g., speaker) and, e.g., inaudible sound. When the beacon is received by the processing circuitry using the camera and/or microphone, it is an indication that the movable partition has been removed.

Once the change in the layout of the meeting room, e.g., the removal of the movable partition, has been determined, the processing circuitry operates in a proximity joining mode, as discussed in the preceding.

In some embodiments, the processing circuitry is configured to, in the proximity joining mode, send a join notification message to one or more of a room configuration management server and the at least one proximate video conferencing system. The join notification message may be a unicast, multicast, or broadcast message that informs of the entry of the proximity joining mode of the video conferencing system. The join notification message in some embodiments may comprise configuration information, such as information on the system's capabilities, number of cameras/microphones, supported protocols, etc. In some embodiments, the join notification message may alternatively or additionally comprise address information of the video conferencing system, e.g., IP address.

In the context of the present explanation, the room configuration management server, may be of any suitable type of device that is connected to the video conferencing system and at least one proximate video conferencing system. In some embodiments, the room configuration management server handles reconfiguration of the video conferencing system and any proximate video conferencing system when a change in the layout is determined. In some embodiments, the room configuration management server may be preset with information with respect to room layout and room equipment, e.g., a room configuration database that associates meeting rooms, positioning of meeting rooms, and correspondingly installed video conferencing equipment.

For example, if meeting room A comprises the video conferencing system and adjacent meeting room B comprises proximate video conferencing system 1, the room configuration management server may be configured to allow joined operation of the video conferencing system and proximate video conferencing system 1 when the movable partition between meeting rooms A and B is removed, based on the room configuration database.

In some embodiments and when operation in the proximity joining mode is completed, the processing circuitry begins joined operation with the at least one proximate video conferencing system.

In some embodiments and during joined operation, the processing circuitry is configured to either receive one or more of proximate video data and proximate audio data from the at least one proximate video conferencing system or to provide one or more of the video data and the audio data to the at least one proximate video conferencing system.

The present embodiments provide that one of the video conferencing systems is the 'master' video conferencing system, while the remaining joint operating video conferencing systems are 'slaved' and provide their respective video and audio data to the master system. The master then can manage combining video and audio and providing combined video and audio streams to the at least one remote conferencing participant.

In some embodiments, a determination of which video conferencing system is the master video conferencing system is made by the room configuration management server and may thus, e.g., be predefined. Alternatively, in cases without room configuration management server, the determination may be made in some embodiments by the video conferencing system and the at least one proximate video conferencing system. For example, it may be possible to predefine a priority schedule when installing the video conferencing system. Alternatively, and in another example, the video conferencing system with the lowest serial number may be selected as master. Alternatively, and in another example, the video conferencing system with the best capabilities may be selected as the master, e.g., the more powerful video conferencing system, which would be better suited to be the master, may correspondingly selected as master.

The preceding examples allow an 'ad-hoc' joined operation with less configuration being necessary. The idea of an ad-hoc negotiation for who is the master and who is the slave could conducted similar to the handshake that occurs during a SIP call. Accordingly and in some embodiments, the join notification message may comprise a listing the capabilities of the video conferencing system. Similarly, a join notification confirmation, discussed in more detail in the following and provided by the at least one proximate video conferencing system may comprise a listing of the capabilities of the proximate video conferencing system. The two systems in these embodiments may have logic circuitry to determine which system is better suited to be master. For example, one system may have Wi-Fi only, the other may be hard wired to the LAN and should have a more reliable connection to the network and thus should be master. Another example is that one system has more peripherals connected to it so orchestration of the peripherals make it the master and so forth.

In another embodiment, the determination of which system is master may be made on a random basis. The selection may be indicated to a user by a visual indication, e.g., a corresponding LED.

In some embodiments, the join notification message is transmitted using the interface, e.g., over a common network connection. Alternatively, and in some embodiments, the video conferencing system further comprises a low energy wireless interface, connected with the processing circuitry. Herein, the processing circuitry may be configured to transmit the join notification message via the low energy interface. For example, the low energy wireless interface may be configured for operation using Bluetooth Low Energy (BLE) transmissions.

In some embodiments, the video conferencing system further comprises a sound emitter, such as a speaker, connected with the processing circuitry. Herein, the processing circuitry may be configured to transmit the join notification message via the sound emitter, e.g., using an inaudible audio signal.

In some embodiments, the video conferencing system further comprises a light emitter, such as an LED or screen, connected with the processing circuitry. Herein, the processing circuitry may be configured to transmit the join notification message via the light emitter, e.g., using invisible light.

In some embodiments, the processing circuitry in the proximity joining mode is additionally configured to receive a join confirmation message from one or more of a room configuration management server and the at least one proximate video conferencing system.

The join confirmation message may be a unicast, multicast, or broadcast message, provided by the room configuration management server and/or the at least one proximate video conferencing system.

The join confirmation message in some embodiments may comprise configuration information of the at least one proximate video conferencing system that joins during joined operation. Such information may comprise in some embodiments, information on the at least one proximate video conferencing system's capabilities, number of cameras/microphones, supported protocols, connectivity (e.g., whether Wi-Fi or LAN connected) and/or address information of the at least one proximate video conferencing system, e.g., IP address.

In case the join confirmation message is provided by the at least one proximate video conferencing system, e.g., in a setup without room configuration management server, the join confirmation message may be simply the join notification message of the at least one proximate video conferencing system.

The latter case is based on a setup, where, e.g., the at least one proximate video conferencing system is identical in functionality to the video conferencing system as discussed herein. In this case, both systems may determine the change in layout, e.g., the removal of the movable partition between the two meeting rooms in which these systems are installed and subsequently would operate in the proximity joining mode.

The determination by both systems may improve the reliability of the linking further, in particular in scenarios, where more than two meeting rooms are adjacent to each other, like in a setup of a row of three or more meeting rooms that have movable partitions between each other.

In some embodiments, the processing circuitry only enters joined operation in case a join notification message is also received from at least one proximate video conferencing system. The reception of the join notification message may take place via the same or different channel that the join notification message is sent.

In some embodiments, the processing circuitry is additionally configured to terminate joined operation, wherein upon termination of joined operation, a disjoin notification message is sent to one or more of a room configuration management server and the at least one proximate video conferencing system. The transmission of the disjoin notification message may take place via the same or different communication channel and/or interface that the join notification message is sent.

The termination of joined operation allows to separate previously joined video conferencing systems. In some embodiments, the processing circuitry is additionally configured to determine if a replacement of the movable partition of the meeting room has occurred; and to terminate joined operation when the replacement of the movable partition of the meeting room has occurred. Accordingly, in case the movable partition has been put back in place to separate the meeting room and the at least one adjacent meeting room, the video conferencing system and the at least one proximate video conferencing system may be reconfigured to operate separately from each other.

In some embodiments, the once joined operation is terminated, processing circuitry stops to receive one or more of proximate video data and proximate audio data from the at least one proximate video conferencing system and stops to provide one or more of the video data and the audio data to the at least one proximate video conferencing system.

In some embodiments, the processing circuitry, upon termination of joined operation, is additionally configured to receive a disjoin confirmation message from one or more of the room configuration management server and the at least one proximate video conferencing system. The functionality of the processing circuitry in the present embodiments correspond to the functionality discussed in the preceding with respect to reception of a join notification message and join confirmation message.

In some embodiments, the processing circuitry is configured to determine if a change in the layout of the meeting room has occurred in predefined intervals. In other words, the processing circuitry may 'wake up' occasionally when not in use to determine changes in the layout.

In some embodiments, the processing circuitry is configured to detect motion in the meeting room, e.g., from the video data and upon a detection of motion, to determine if a change in the layout of the meeting room as occurred. Typical motion detection methods may be used.

In another exemplary aspect, processing circuitry for a video conferencing system for a reconfigurable meeting room is provided, wherein the processing circuitry being connectable with one or more of a camera and a microphone to receive at least one of video and audio. In some embodiments, the processing circuitry is configured to determine if a change in the layout of the meeting room has occurred, using at least one of the camera and the microphone, and upon determination that the change in the layout has occurred, operate in a proximity joining mode in which the processing circuitry allows or conducts linking of the video conferencing system with at least one proximate video conferencing system for joined operation.

In some embodiments, the processing circuitry according to the present aspect is configured according to one or more of the embodiments, discussed in the preceding with respect to the preceding aspect(s). With respect to the terms used and their definitions, reference is made to the preceding aspect(s).

In another exemplary aspect, a method of operating a video conferencing system for a reconfigurable meeting room is provided. Herein, the video conferencing system comprises at least one of a camera for capturing video of at least a section of the meeting room (and to provide video data) and a microphone for capturing audio in the meeting room (and to provide audio data). The method comprises the steps of:

determining, using at least one of the camera and the microphone, if a change in the layout of the meeting room has occurred; and upon determination that the change in the layout has occurred, operating in a proximity joining mode in which the video conferencing system allows or conducts linking with at least one proximate video conferencing system for joined operation.

In some embodiments, the method steps are conducted by processing circuitry of the video conferencing system. In some embodiments, a (e.g., non-transitory) computer-readable medium is provided with contents that are configured to cause a video conferencing system or processing circuitry for a video conferencing system to conduct the method steps.

In some embodiments, the video conferencing system according to the present aspect is configured according to one or more of the embodiments, discussed in the preceding with respect to the preceding aspect(s). With respect to the terms used and their definitions, reference is made to the preceding aspect(s).

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows an exemplary embodiment of a video conferencing system 1 according to the invention in a schematic block diagram, in the following also referred to as 'system' for simplicity.

The system 1 comprises two cameras 2, which are high-definition 1080p cameras, arranged to capture a left section and a right section of a reconfigurable meeting room 10 (see FIG. 2), including movable partition wall 13. The system 1 furthermore comprises three microphones 3 that form an adaptive beamforming microphone array to capture presenting/speaking local conferencing participants, i.e., persons in the meeting room 10. The cameras 2 and the microphones 3 are connected to system controller 4, which comprises processing circuitry 5 and a network interface 6. The interface may connect to a LAN 7, so that a conference with at least one remote conferencing participant (i.e., not in meeting room 10) can be conducted over the Internet 8. The system controller 4 is furthermore connected to a video screen 9, which comprises a display and speaker to show incoming audio/video streams from the at least one remote conferencing participant to the local conferencing participants in the meeting room 10.

The system controller 4 handles the reception and transmission of audio/video streams between the system 1 and the at least one remote conferencing participant. The system controller 4 comprises a microprocessor and memory (both not shown) with a suitable programming to provide the corresponding audio/video stream transmission and reception functionality. In this embodiment, the microprocessor may be a Qualcomm Snapdragon 835 for example.

The processing circuitry 5 is configured to determine a change in the layout of the meeting room and, upon determination of a change, operation in a proximity joining mode, as will be discussed more thoroughly in the following. The functionality of circuitry 5 in the present embodiment is provided when executing corresponding software, stored in the memory of system controller 4, on the microprocessor of the system controller 4. Alternatively or additionally, it is possible to provide at least a part of the functionality of at least the processing circuitry 5 by dedicated hardware.

Figure 2:
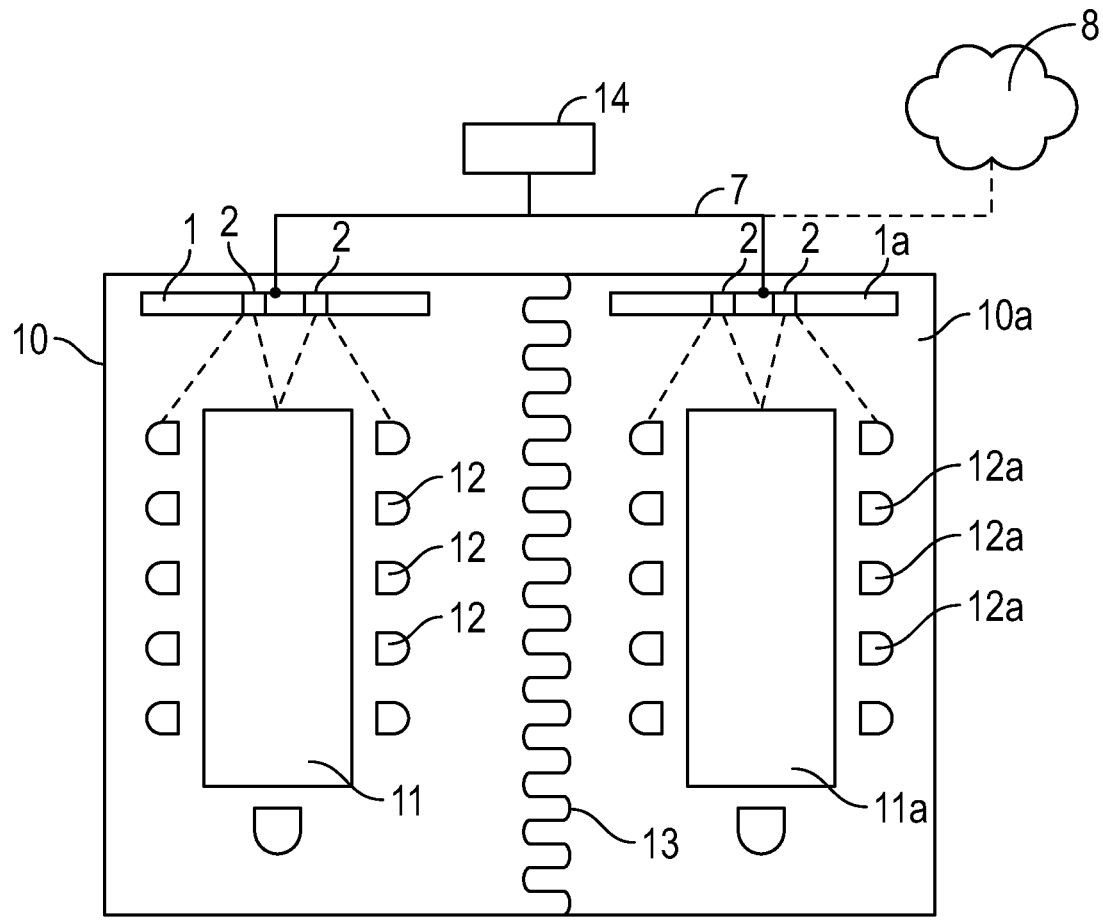
FIG. 2 shows a schematic top view of an embodiment of two reconfigurable meeting rooms with a movable partition wall and the video conferencing system of the embodiment of FIG. 1.

FIG. 2 shows a schematic top view of meeting room 10 with the video conferencing system 1 installed therein. The meeting room 10 comprises a conference table 11 with multiple chairs 12. As follows from FIG. 2, an adjacent meeting room 10a is arranged on the right hand side of meeting room 10. The adjacent meeting room 10a is equipped identical to meeting room 10 in this exemplary embodiment, accordingly, the same or similar items in adjacent meeting room 10a have been given the same reference numeral with an added appendix 'a'. For example, reference numeral 1a designates a proximate video conferencing system. Proximate video conferencing system 1a and video conferencing system 1 are of the same type.

While meeting rooms 10, 10a in this embodiment are equipped identically, it is possible that the equipment and/or layout of the rooms 10, 10a differ from each other in corresponding embodiments.

Meeting room 10, as discussed in the preceding, is a reconfigurable meeting room, meaning in this exemplary embodiment that a movable partition wall 13 is provided that can be removed and replaced. Accordingly, it is possible to combine meeting rooms 10, 10a by removing the movable partition wall 13, which is shown in the schematic view of FIG. 3. This setup provides increased flexibility as it allows to use the rooms 10, 10a and thus the video conferencing systems 1, 1a separately from each other when the movable partition wall 13 is in place, and also to obtain a larger room when the movable partition wall 13 is removed. The movable partition wall 13 in the present embodiment is of foldable type. Other types of movable partition walls are possible, such as movable partition walls that can be moved up and down into a corresponding void in the ceiling, e.g., a roll-up door partition. The movable partition wall 13 provides soundproofing to allow the two meeting rooms 1, 1a to be used separately from each other without disturbing the respective adjacent room.

Figure 3:
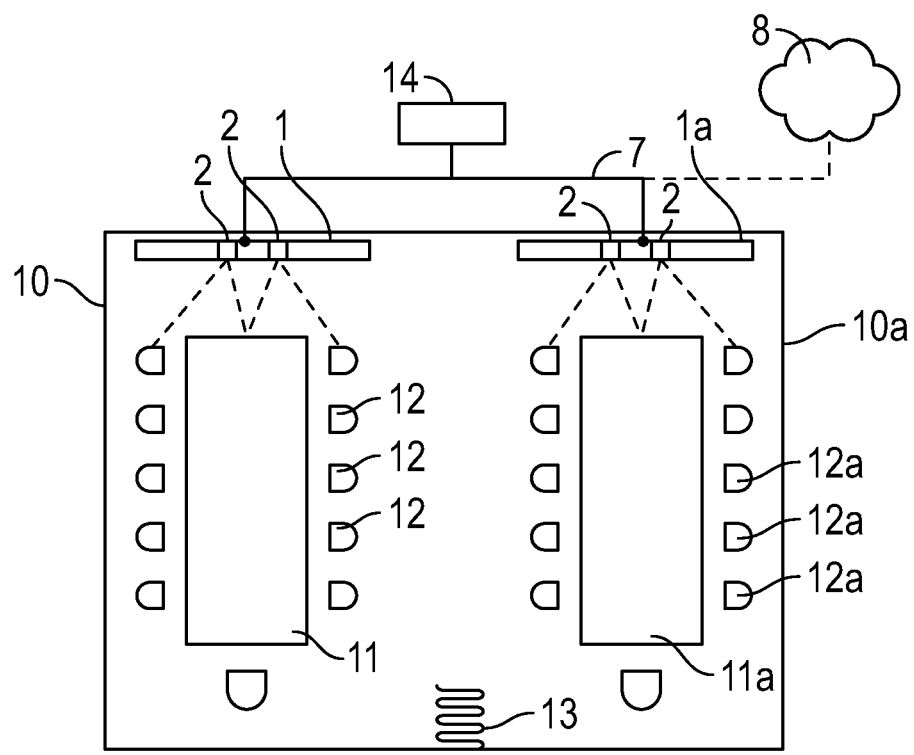
FIG. 3 shows the embodiment of FIG. 2 with the movable partition wall removed.

As can be seen from FIGS. 2 and 3, video conferencing system 1 and proximate video conferencing system 1a are connected to LAN 7 and Internet 8 to allow conducting video conferences with remote conferencing participants. In the embodiments of FIGS. 2 and 3, a room configuration management server 14 is connected to LAN 7 and thus to both video conferencing systems 1, 1a.

As discussed in the preceding, processing circuitry 5 of video conferencing system 1 is configured to determine a change in the layout of the meeting room and, upon determination of a change, operation in a proximity joining mode. Since proximate video conferencing system 1a is identical to video conferencing system 1, the following operation also applies to its processing circuitry (not shown).

The operation of processing circuitry 5 is in the following discussed with reference to the flow diagram of FIGS. 4A through 4C. It is noted that the operation of processing circuitry 5 is conducted independent of conducing of a video conference. In some embodiments, the following operation of processing circuitry 5 is only conducted when no video conference is actively conducted. In this case, the processing circuitry 5 is in sleep mode when a video conference is active. This is assumed in the following. In other embodiments, the following operation is conducted irrespective of whether a video conference is active.

Figure 4A:
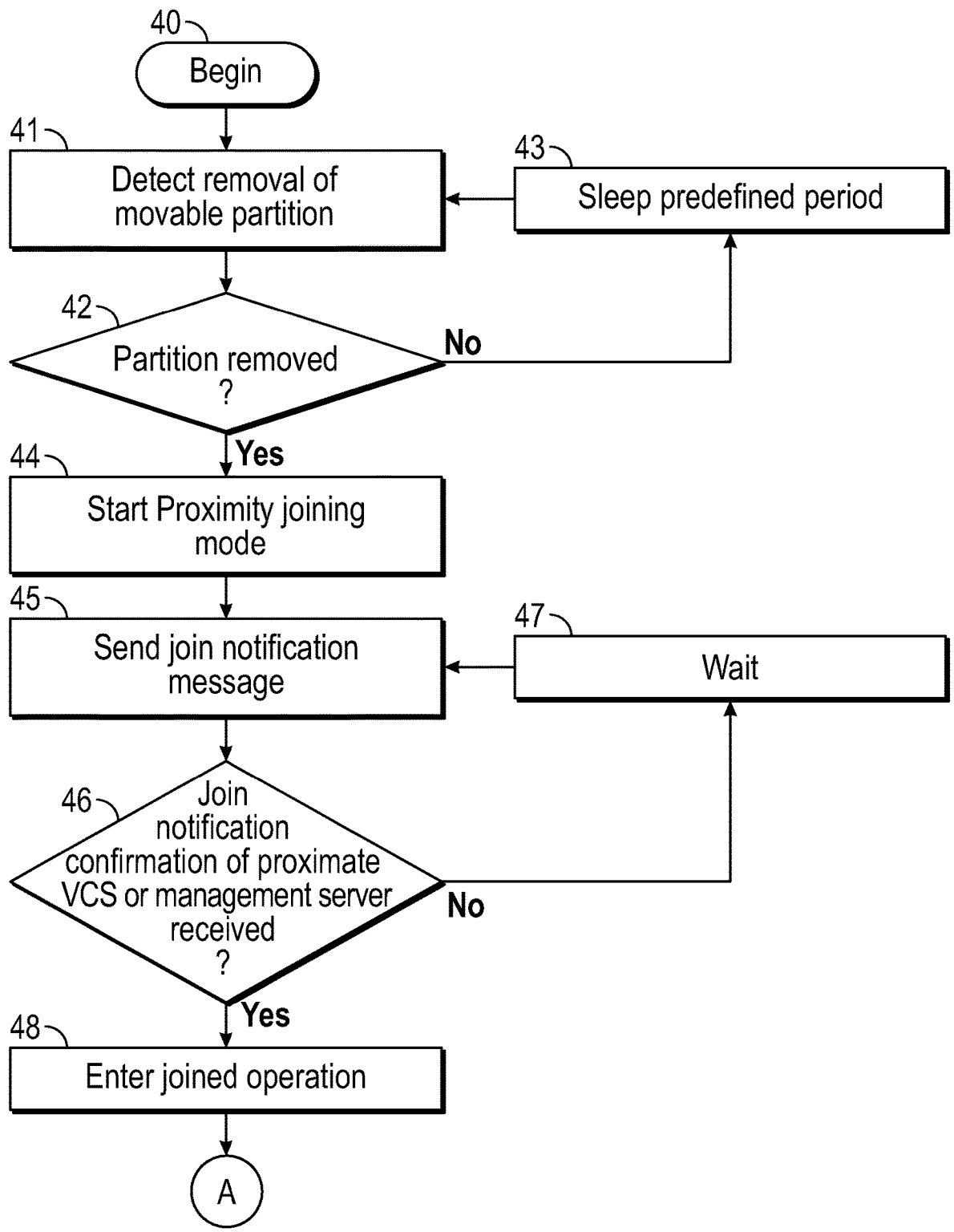
FIGS. 4A-4C shows a flow diagram of the operation of processing circuitry of the video conferencing system of FIG. 1 according to an embodiment.
Figure 4B:
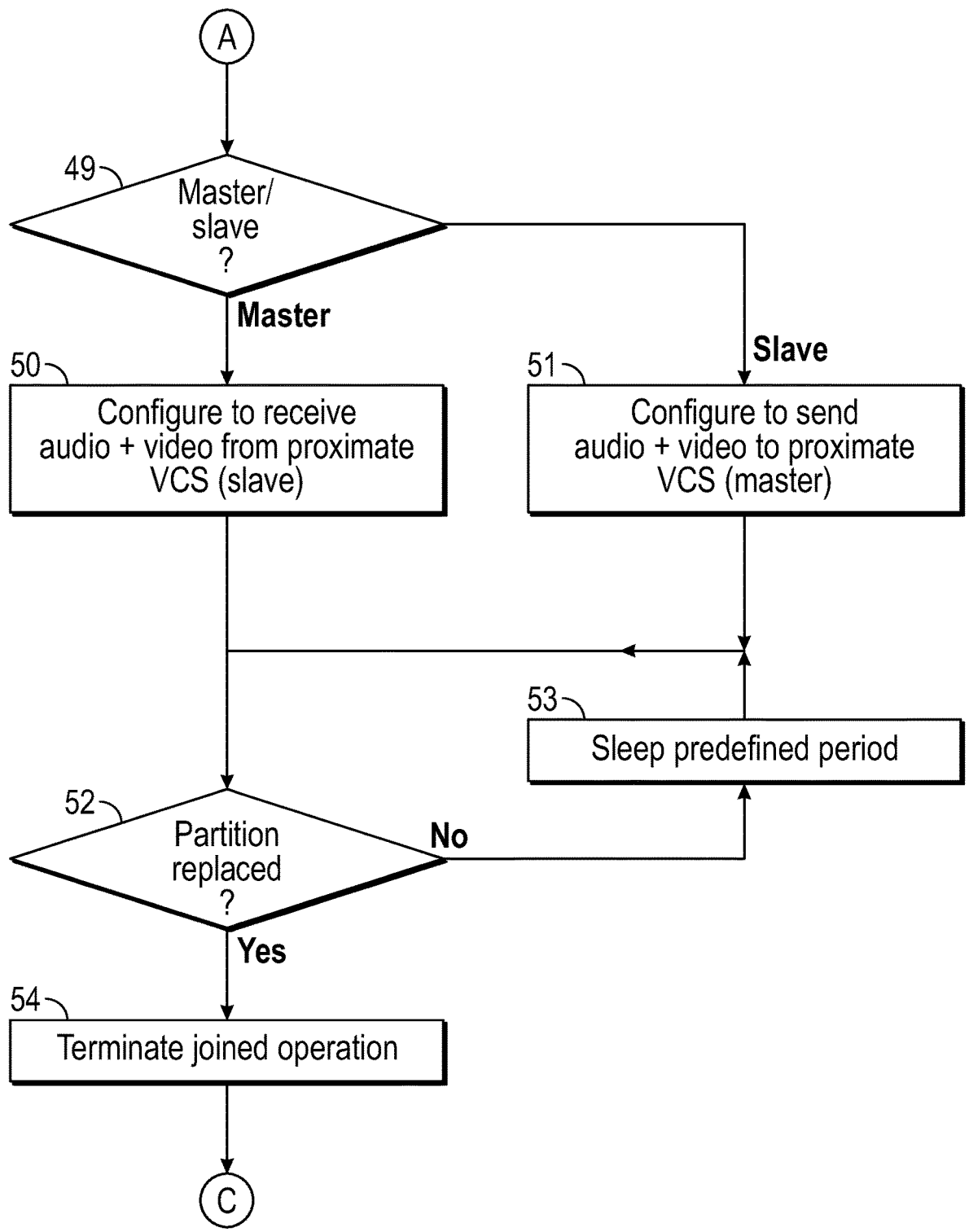
Figure 4C:
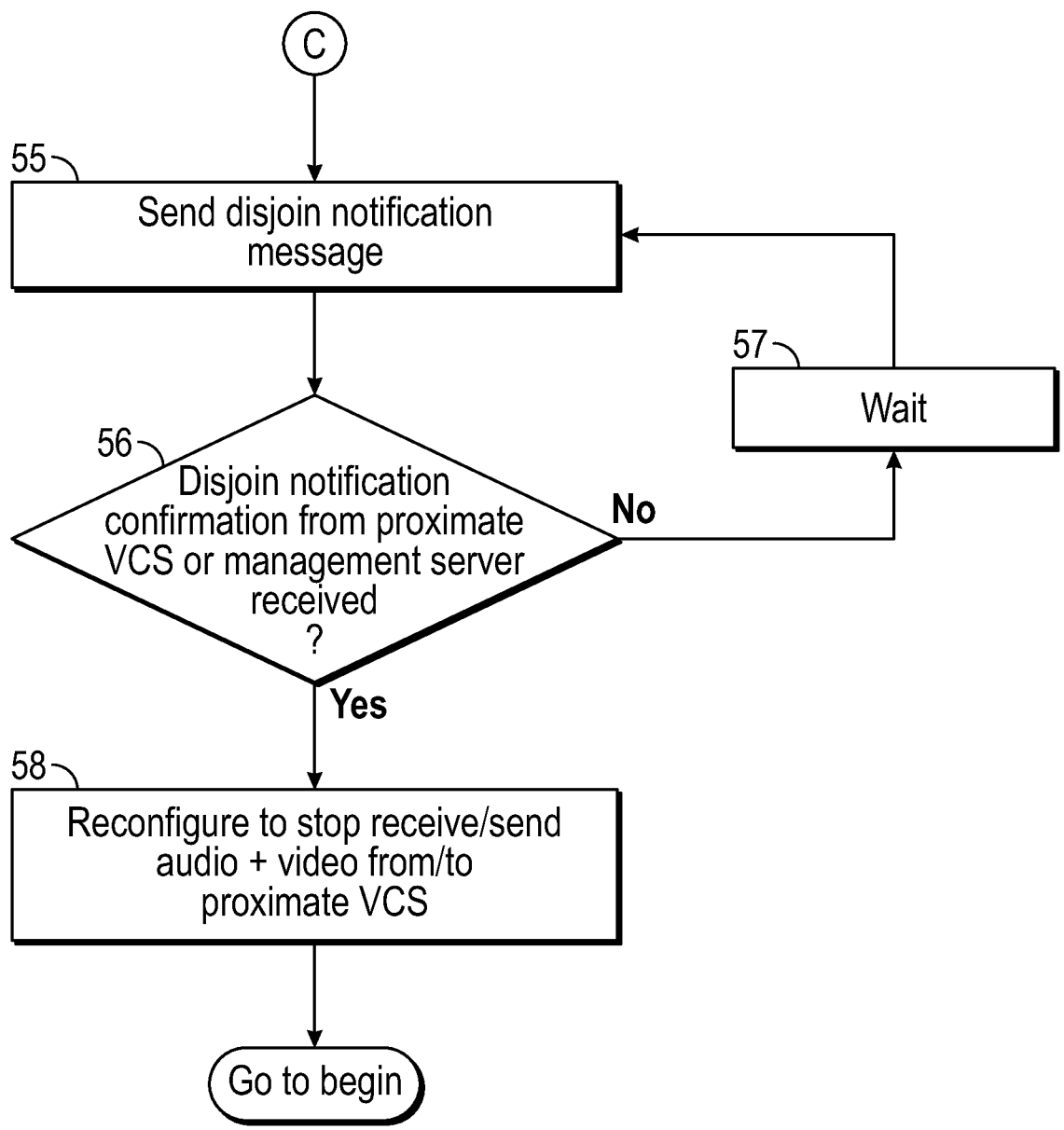

The operation of processing circuitry 5, according to the embodiment of FIGS. 4A through 4C begins in step 40 when the video conferencing system 1 is connected to power. Once the system 1 is initialized, processing circuitry 5 determines, if the movable partition wall 13 is in place, i.e., arranged between the meeting room 10 and the adjacent meeting room 10a. For this, processing circuitry 5 queries the cameras 2 to obtain video data of the meeting room 10 and applies an object detection algorithm to the obtained video data, such as YOLO v3, which is trained to discern between video data that shows the wall 13 between the rooms 10, 10a, and video that shows the situation with the wall 13 removed. If it is determined in step 42 that the movable partition wall 13 is in place, the processing circuitry 5 in step 43 sleeps/pauses for a predefined period, e.g., 60 seconds.

If in step 42 it is determined that the movable partition wall 13 has been removed (see FIG. 3), the processing circuitry 5 in step 44 starts operating in a proximity joining mode. During the proximity joining mode, the processing circuitry 5 in step 45 sends a join notification message over LAN 7 to the room configuration management server 14. The join notification message comprises information, informing the room configuration management server 14 that a change in the layout of the meeting room 1 has been determined. In the present embodiment, and since the proximate video conferencing system 1*a* is identical to video conferencing system 1, a corresponding join notification message is provided by proximate video conferencing system 1*a* to the room configuration management server 14. The room configuration management server 14 comprises a room configuration database that provides a predefined association between meeting rooms, positioning of meeting rooms, and correspondingly installed video conferencing equipment.

In the present example, room configuration management server 14 is configured with layout information that provides that the meeting room 10 and the adjacent meeting room 10*a* are arranged next to each other. Since room configuration management server 14 has received join notification messages from both, the video conferencing system 1 and the proximate video conferencing system 1*a*, it can safely be determined that a change of the room configuration has taken place and that thus, a reconfiguration of the video conferencing systems 1, 1*a* is required. It is noted that in some embodiments, room configuration management server 14 is configured so that the reception of one join notification message is sufficient to trigger the reconfiguration of the video conferencing systems 1, 1*a*.

To reconfigure the video conferencing systems 1, 1*a*, the room management server 14 sends join notification confirmations to both video conferencing systems 1, 1*a*. The join notification confirmations define, which system 1, 1*a* is a 'master' and which is a 'slave' the during the subsequent joined operation of video conferencing systems 1, 1*a* as pre-defined in the room configuration database. For the purposes of the present exemplary discussion, it is assumed that video conferencing system 1 is the master system and that proximate video conferencing system 1*a* is a slave system, which slave system provides its audio data and video data to the master system, i.e., video conferencing system 1. The join notification confirmation send to proximate video conferencing system 1*a* correspondingly comprises IP address data of the master system 1 and instructions for the proximate video conferencing system 1*a* to send its audio data and its video data to system 1.

Reverting back to the flow diagram of FIG. 4A, in step 46, it is determined if the join confirmation message has been received. If this is not the case, the processing circuitry 5 waits for a predefined timeout period and then rechecks the reception of the join confirmation message. Once the join confirmation message is received, the processing circuitry enters joined operation in step 48. Herein, it is first determined from the join confirmation message, if the video conferencing system 1 (abbreviated 'VCS' in FIG. 4A) is master or slave in step 49. If it is determined that the system 1 is the master, the processing circuitry 5 configures the system controller 4 to receive audio data and video data from the slave system, i.e., proximate video conferencing system 1, in step 50. The configuration of the system controller 4 is similar to configuring the system controller 4 with an additional camera and microphone. Alternatively and if it is determined that the system 1 is the slave, in step 51, the processing circuitry 5 configures the system controller 4 to provide the audio data and video data from the cameras 2 and the microphone 3 to the master system using the IP address data as comprises in the join confirmation message.

Once the reconfiguration is complete, the video conferencing system 1 and the proximate video conferencing system 1*a* operate in joined operation, reflecting the likewise joined meeting room 10 with proximate meeting room 10*a*.

In step 52, the processing circuitry 5 determines from video data of cameras 2, whether the movable partition wall 13 has been replaced, i.e., put back in place to separate meeting rooms 10, 10*a* (see FIG. 2). If this is not the case and in step 53 the processing circuitry 5 sleeps/pauses for a predefined period, e.g., 30 seconds.

If it is determined that the movable partition wall 13 has been replaced between meeting rooms 10, 10*a*, and in step 54, the joined operation is terminated. Specifically and in step 55, the processing circuitry 5 sends a disjoin notification message to room configuration management server 14. Once the server 14 has received corresponding disjoin notification messages from both systems 1, 1*a*, disjoin notification confirmations are provided to both systems 1, 1*a* from the server 14. Processing circuitry 5 in step 56 determines, if the disjoin notification confirmation has been received. If this is not the case and in step 57 the processing circuitry 5 waits for a predefined timeout period.

Once the disjoin notification confirmation is received by the processing circuitry 5 and in step 58, the processing circuitry 5 in step 58 configures the system controller 4 to, in case of the master system, receive audio data and video data from the slave system, and, in case of the slave system, to provide audio data and video data to the master system. The operation then reverts back to step 40.

As shown in the preceding, the video conferencing system 1 as discussed herein provides an efficient and user-friendly way of reconfiguring itself in case of a correspondingly reconfigurable meeting room 1.

As will be apparent from the preceding, the use of video conferencing system 1 is not limited to an arrangement of two adjacent meeting rooms 1, 1*a*, as shown in FIGS. 2 and 3.

Figure 5:
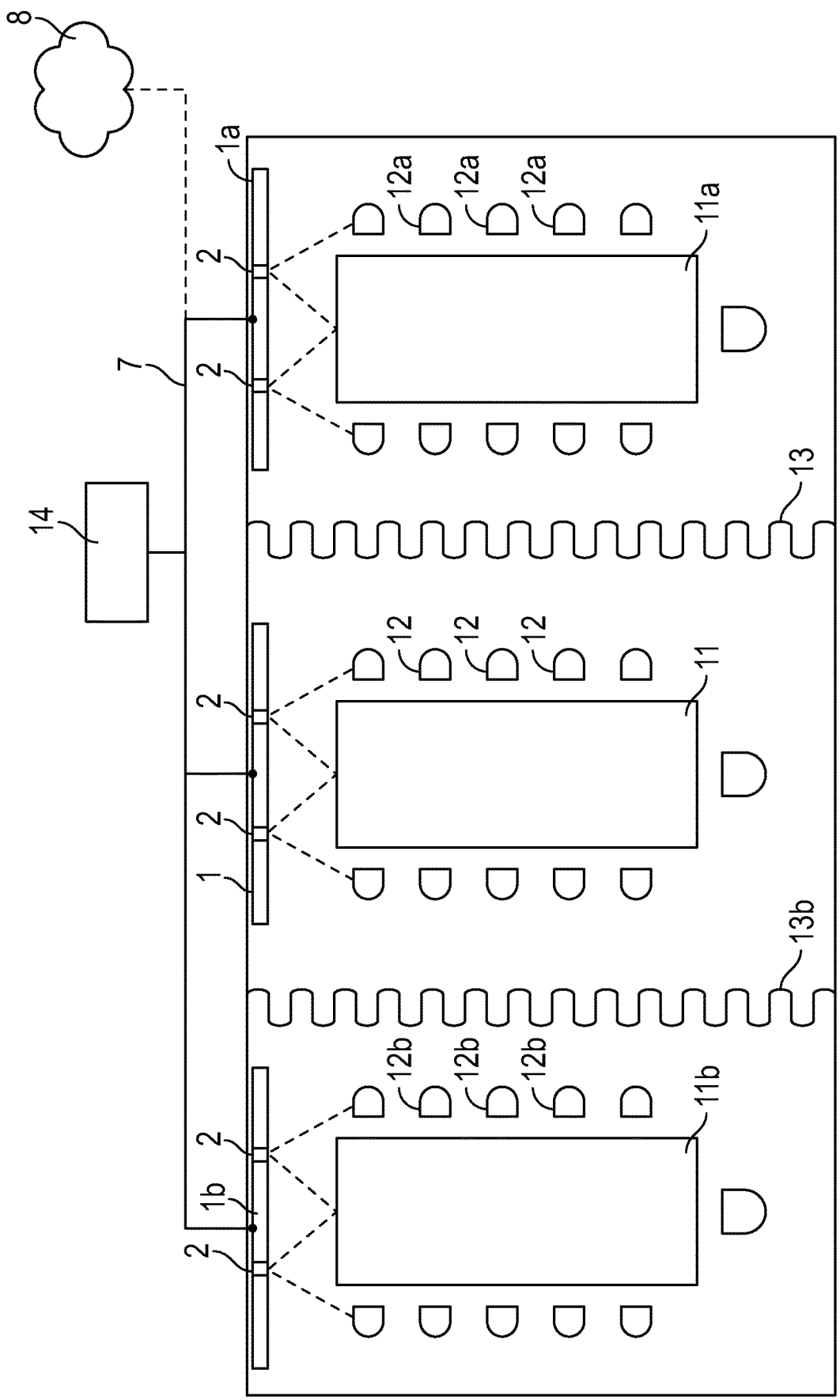
FIG. 5 shows an schematic top view of an embodiment of three reconfigurable meeting rooms with movable partitions and the video conferencing system of the embodiment of FIG. 1.

FIG. 5 shows an schematic top view of an arrangement of meeting room 1 with a first adjacent meeting room 1*a* and a second adjacent meeting room 1*b*, arranged on opposing sides of meeting room 1. The second adjacent meeting room 1*b* comprises a second proximate video conferencing system 1*b*, which herein is identical to video conferencing system 1. The second adjacent meeting room 1*b* comprises table 11*b* and chairs 12*b*, corresponding to the meeting room 1 and first adjacent meeting room 1*a*. A second movable partition wall 13*b* is arranged between meeting room 1 and the second adjacent meeting room 1*b*.

The operation of the processing circuitry 5 of either video conferencing system 1, 1*a*, 1*b* is identical to the preceding discussion of the embodiment of FIGS. 4A-4C. It will be apparent that configurations are possible, where two meeting rooms 1, 1*a*, 1*b* are combined and thus, two of the video conferencing systems 1, 1*a*, 1*b* are configured for joined operation. In addition, a configuration is possible in which all three meeting rooms 1, 1*a*, 1*b* are combined. In this case, one of the video conferencing systems 1, 1*a*, 1*b* is configured as master system by the room configuration management server 14, while the remaining video conferencing systems 1, 1*a*, 1*b* are configured as slave system and provide the audio data and video data, captured by their respective cameras 2 and microphones 3 to the master system. Since, as discussed in the preceding with reference to FIGS. 4A-4C, the room configuration management server 14 only reconfigures the respective video conferencing systems 1, 1a, 1b, when join notification messages from the respective systems 1, 1a, 1b are received that have determined a change in the layout of their respective meeting room 10, 10a, 10b, the room configuration management server 14 can easily and safely determine, which systems 1, 1a, 1b are to be reconfigured for joined operation.

It is noted that the operation of processing circuitry 5 is not limited to a setup having two or three meeting rooms 10, 10a, 10b. A setup with a higher number of meeting rooms is possible, as will be easily apparent.

Figure 6:
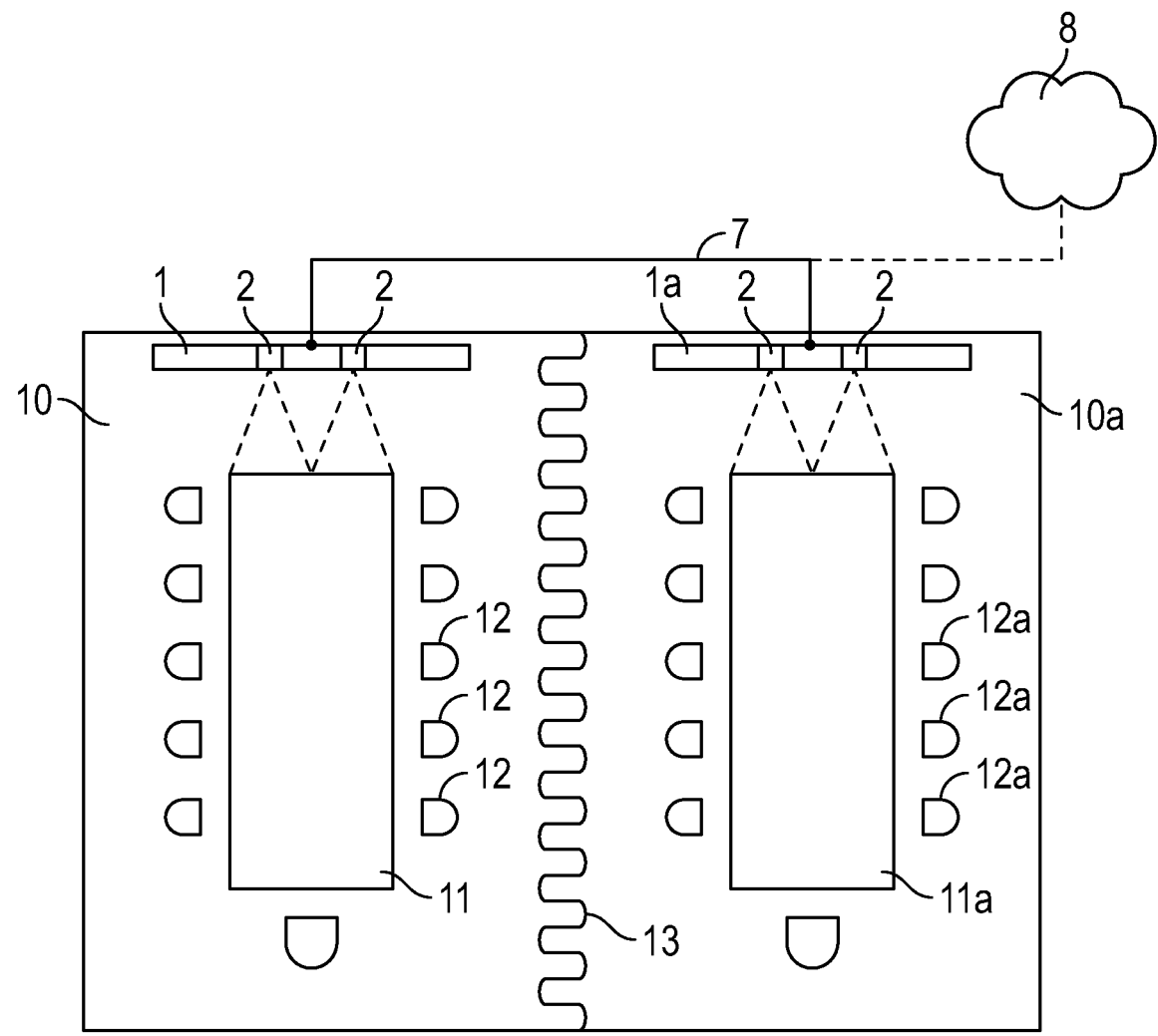
FIG. 6 shows a schematic top view of another embodiment of two reconfigurable meeting rooms with a movable partition wall and a video conferencing system.

FIG. 6 shows a schematic top view of another embodiment of two reconfigurable meeting rooms with a movable partition wall and the video conferencing system of the embodiment of FIG. 1. The embodiment of FIG. 6 corresponds to the embodiment of FIG. 2 with the following exceptions. As will be apparent, the embodiment of FIG. 6 does not comprise a room configuration management server 14. The video conferencing system 1 and the proximate video conferencing system 1a are setup for 'peer-to-peer' communication and each comprise a low energy wireless interface, namely a Bluetooth low energy interface (not shown).

The operation of the processing circuitry 5 corresponds to the operation, discussed in the preceding with reference to FIGS. 4A-4C, with the following exceptions. In step 45, the join notification message is provided via the low energy wireless interface to the respective other video conferencing system, i.e., with respect to the processing circuitry 5 of video conferencing system 1 to the proximate video conferencing system 1a. It is noted that also here, the operation of processing circuitry 5 of proximate video conferencing system 1a is identical to the operation of processing circuitry 5 of the video conferencing system 1.

The join notification message in the present embodiment comprises IP address data of the video conferencing system 1 together with a predefined numeric priority identifier. Herein, video conferencing system 1 has been programmed with priority identifier 0, while proximate video conferencing system 1a has been programmed with priority identifier 1.

In step 46, the processing circuitry 5 determines, whether a join notification confirmation has been received from the proximate video conferencing system 1a. Herein, the join notification confirmation is simply the respective join notification message of proximate video conferencing system 1a.

The determination, if the system 1 is master or slave in step 49 is conducted on the basis of the priority identifier, wherein the lowest priority identifier is the master. The following operation of steps 52-54 corresponds to the preceding discussion of FIGS. 4A through 4C.

Corresponding to the exchange of join notification messages/join confirmation messages in steps 45 and 46 as discussed with respect to FIG. 6 directly between the video conferencing system 1 and the proximate video conferencing system 1a, the exchange of disjoin notification messages takes place. In step 55, the video conferencing system 1 sends a disjoin notification message directly to proximate video conferencing system 1a via the low energy wireless interface. In step 56, it is determined if a corresponding disjoin confirmation message from the proximate video conferencing system 1a has been received via the low energy wireless interface, which disjoin confirmation message herein is the respective disjoin notification message of the proximate video conferencing system 1a. Once this message is received, the video conferencing system 1 is reconfigured in step 58 as discussed before.

The operation of the proximate video conferencing system 1a is vice versa to the preceding discussion of the operation of video conferencing system 1.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuitry", "unit", and "system" are intended to encompass hardware, software, firmware, or any combination thereof. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this description as an embodiment of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A video conferencing system for a reconfigurable meeting room, comprising at least:
   a camera for capturing video of at least a section of the meeting room and to provide video data;
   a microphone for capturing audio in the meeting room and to provide audio data; and
   processing circuitry, connected at least with the camera and microphone to receive at least one of the video and audio; wherein
      the processing circuitry is configured to determine if a change in the layout of the meeting room has occurred, using at least one of the camera and the microphone, and upon determination that the change in the layout has occurred, operate in a proximity joining mode in which the processing circuitry allows linking with at least one proximate video conferencing system for joined operation; and wherein the processing circuitry is configured to, in the proximity joining mode, send a join notification message to one or more of a room configuration management server and the at least one proximate video conferencing system.

2. The video conferencing system of claim 1, wherein the processing circuitry is adapted to determine whether a change in layout has occurred by detecting a removal of a movable partition of the meeting room.

3. The video conferencing system of claim 2, wherein the processing circuitry is adapted to detect the removal of the movable partition using the camera.

4. The video conferencing system of claim 3, wherein the processing circuitry is configured for object detection in the video data to detect the removal of the movable partition.

5. The video conferencing system of claim 2, wherein the processing circuitry is adapted to detect the removal of the movable partition using the microphone.

6. The video conferencing system of claim 1, wherein when operation in the proximity joining mode is completed, the processing circuitry begins joined operation with the at least one proximate video conferencing system.

7. The video conferencing system of claim 6, wherein during joined operation, the processing circuitry is configured to either receive one or more of proximate video data and proximate audio data from the at least one proximate video conferencing system or to provide one or more of the video data and the audio data to the at least one proximate video conferencing system.

8. The video conferencing system of claim 1, further comprising a low energy wireless interface, connected with the processing circuitry; wherein the processing circuitry is configured to transmit the join notification message via the low energy interface.

9. The video conferencing system of claim 1, further comprising a sound emitter, connected with the processing circuitry; wherein the processing circuitry is configured to transmit the join notification message via the sound emitter.

10. The video conferencing system of claim 1, wherein the processing circuitry, in the proximity joining mode is additionally configured to receive a join confirmation message from one or more of a room configuration management server and the at least one proximate video conferencing system.

11. The video conferencing system of claim 1, wherein the processing circuitry is additionally configured to terminate joined operation, wherein upon termination of joined operation, a disjoin notification message is sent to one or more of a room configuration management server and the at least one proximate video conferencing system.

12. The video conferencing system of claim 11, wherein the processing circuitry is additionally configured to
determine if a replacement of a movable partition of the meeting room has occurred; and to
terminate joined operation when the replacement of the movable partition of the meeting room has occurred.

13. The video conferencing system of claim 11, wherein the processing circuitry, upon termination of joined operation, is additionally configured to receive a disjoin confirmation message from one or more of the room configuration management server and the at least one proximate video conferencing system.

14. The video conferencing system of claim 1, wherein the processing circuitry is configured to determine if a change in the layout of the meeting room has occurred in predefined intervals.

15. The video conferencing system of claim 1, wherein the processing circuitry is configured to detect motion in the meeting room and upon a detection of motion, to determine if a change in the layout of the meeting room as occurred.

16. Processing circuitry for a video conferencing system for a reconfigurable meeting room, the processing circuitry being connectable with one or more of a camera and a microphone to receive at least one of video and audio; wherein the processing circuitry is configured to determine if a change in the layout of the meeting room has occurred, using at least one of the camera and the microphone, and upon determination that the change in the layout has occurred, operate in a proximity joining mode in which the processing circuitry allows linking of the video conferencing system with at least one proximate video conferencing system for joined operation; and wherein the processing circuitry is configured to, in the proximity joining mode, send a join notification message to one or more of a room configuration management server and the at least one proximate video conferencing system.

17. A method of operating a video conferencing system for a reconfigurable meeting room, the video conferencing system comprising at least one of a camera for capturing video of at least a section of the meeting room and a microphone for capturing audio in the meeting room; comprising the steps of:
determining, using at least one of the camera and the microphone, if a change in the layout of the meeting room has occurred; and
upon determination that the change in the layout has occurred, operating in a proximity joining mode in which the video conferencing system allows linking with at least one proximate video conferencing system for joined operation; wherein
in the proximity joining mode, a join notification message is sent to one or more of a room configuration management server and the at least one proximate video conferencing system.

18. A non-transitory computer-readable medium including contents that are configured to cause processing circuitry for a video conferencing system to conduct the method of claim 17.

* * * * *